United States Patent [19]

Ruumpol

[11] 4,028,605
[45] June 7, 1977

[54] SYSTEM FOR PASSING PRODUCTS TO BE TREATED THROUGH A MACHINE

[75] Inventor: Geurt J. Ruumpol, Wilp, Netherlands

[73] Assignee: Veco Beheer Electroforming/Photo Etching B.V., Eerbeek, Netherlands

[22] Filed: Jan. 29, 1975

[21] Appl. No.: 545,004

[30] Foreign Application Priority Data

Feb. 8, 1974 Netherlands .................... 7401788

[52] U.S. Cl. .................................. 318/696
[51] Int. Cl.² .................................. H02K 37/00
[58] Field of Search ...................... 318/138, 696

[56] References Cited
UNITED STATES PATENTS

| | | |
|---|---|---|
| 3,184,663 | 5/1965 | Mergler .................... 318/696 X |
| 3,746,957 | 7/1973 | Forster et al. .............. 318/696 |
| 3,798,526 | 3/1974 | Takahashi et al. ........... 318/696 |
| 3,812,414 | 5/1974 | Abraham et al. ............. 318/696 |
| 3,822,658 | 7/1974 | Conner, Jr. ................. 318/696 X |
| 3,878,761 | 4/1975 | Makowski .................... 318/696 X |

*Primary Examiner*—Gene Z. Rubinson
*Attorney, Agent, or Firm*—Buell, Blenko & Ziesenheim

[57] ABSTRACT

A system is provided for passing products to be treated through a machine having a driving motor, a plurality of supporting rollers driven by said motor and a regulating circuit for controlling the motor, said driving motor being a step motor and the regulating circuit including a constant oscillator and a frequency divider, the input of which is connected to the oscillator and the rectangular output of which drives the step motor and an adjusting element for adjusting the frequency divider.

4 Claims, 3 Drawing Figures

SYSTEM FOR PASSING PRODUCTS TO BE TREATED THROUGH A MACHINE

The invention relates to a system for passing products to be treated through a machine, which system is provided with a driving motor, a plurality of supporting rollers driven by the motor, and a regulating circuit for controlling the driving motor.

Such a system is known in practice. During the guidance of these products to be treated in a machine, such as a traversing furnace or an etching machine and the like, in which the product has to be exposed for a certain time to the action of a reagent, such as a heat-radiation or an etching-liquid jet and the like, often a series of supporting rollers is used which may be driven by a direct-current motor via a gearing drive with delayed action. A tachogenerator is connected to the direct-current motor, which tachogenerator supplies an output voltage proportionate to the rotating speed of the motor. This voltage is compared in a comparing device with a voltage supplied by an adjusting potentiometer. The differential output voltage of the comparing device is amplified in a regulating circuit having a large amplification factor. The output voltage of this regulating circuit controls the direct-current motor. Subsequently, a balance is obtained, whereby a small differential voltage remains in the comparing device which after amplification adjusts the motor to its desired value.

This known system has the following disadvantages. The traversing time of the products under treatment does not remain constant for the same adjustment and for a longer period as a result of dirtying of the brushes of the tachogenerator, temperature influences on the comparing device etc.; the reproduceability (adjustment of the potentiometer) is unfavourable; and the fact that long traversing times, i.e. small rotating speeds of the direct-current motor, are difficult to adjust and to be kept constant.

Accordingly, it is an object of the present invention to obviate said disadvantages and to provide a system of the type mentioned in the beginning, which system is characterized in that the driving motor comprises a step motor; and that the regulating circuit comprises a constant oscillator, a frequency divider, the input of which is connected to the oscillator and the rectangular output signal of which drives the step motor, and an adjusting element for adjusting the frequency divider.

An embodiment of the invention is characterized in that the constant oscillator of the regulating circuit comprises a crystal oscillator.

A further embodiment of the invention is characterized in that the regulating circuit comprises an indication element, by which the traversing time of the products to be treated can be read.

A further embodiment of the invention is characterized in that the frequency divider comprises a fixed frequency divider and an adjustable frequency divider.

The invention will now be described on the basis of an embodiment by way of example only, with reference to the accompanying drawing, in which.

Figure 1:
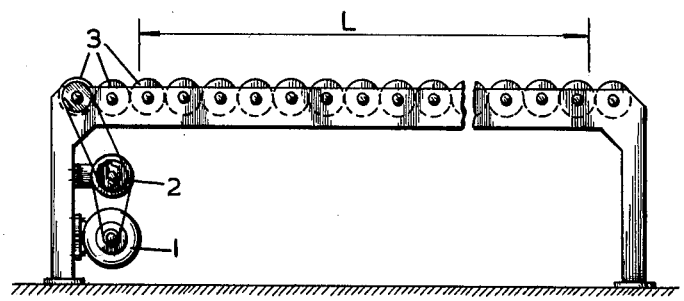
FIG. 1 is a diagram of the principle of the driving motor, the delay and the plurality of the supporting rollers of the known system.

Referring to the drawing, in which like reference numbers refer to like portions throughout, there is shown in FIG. 1 a direct-current motor 1 which drives a series of supporting rollers 3 via a delay element 2. With the aid of these supporting rollers 3 the products to be treated are guided through a machine along a traversing distance of L mm, in which machine they are to undergo a certain treatment.

Figure 2:
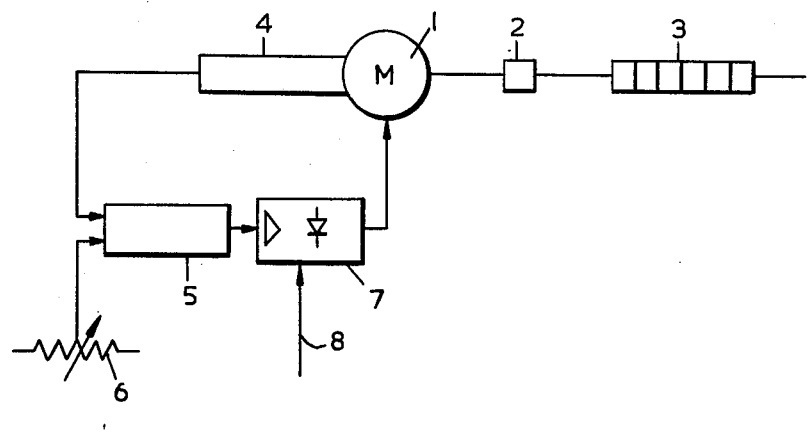
FIG. 2 is a block diagram of known system in the prior art.

In FIG. 2 is shown schematically a regulating circuit which belongs to a system known in the prior art, as indicated in the drawing. A tachogenerator 4 is connected to the direct-current motor 1. The output voltage of the tachogenerator, proportionate to the rotating speed of the motor, is supplied to a comparing device 5. A voltage from an adjusting potentiometer 6 is supplied as well to this comparing device 5. The differential output voltage of the comparing device 5 is supplied to a regulating circuit 7, in which an amplifier having a large amplification factor amplifies the differential voltage. Said amplified voltage then regulates thyristors which, in their turn, control the supply potential 8. This controlled supply potential is subsequently rectified and supplied to the direct-current motor 1. A balance is then obtained in which a small differential voltage remains in 7, which voltage, after amplification, regulates the thyristors to the desired value.

Figure 3:
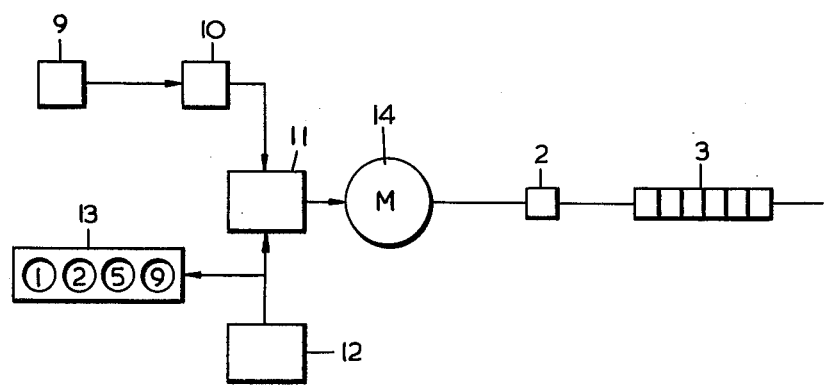
FIG. 3 is a block diagram of an embodiment of the system according to the invention.

In FIG. 3 a constant oscillator 9, such as a crystal oscillator, supplies a high-frequency voltage of 1 MHz for example to a fixed frequency divider 10. This fixed frequency divider 10 subsequently supplies its voltage to a frequency divider 11 which is adjusted by the adjusting element 12. The adjustment can be made visible with an indication element 13, comprising four indication tubes (four decades) for example. The rectangular output voltage of the frequency divider 11 is supplied to a step motor 14, which drives the series of supporting rollers 3 via the mechanical delay 2.

The step motor responds to the front of the rectangular input pulse and subsequently runs over a fixed small angle whereby the number of steps per rotation of the motor is fixed.

Assuming that:
the traversing length $= L$ mm
the diameter of the supporting rollers $= d$ mm
the delay $2 = t$
the number of steps / rotation of the step motor $= n$
the frequency of the crystal oscillator $= 1$ MHz
the factor of the fixed divider $10 = v$,
then a traversing time of 1 second corresponds to $nLt/\pi d$ steps per second of the step motor.

If one wishes the adjustment of the adjusting element 12 to correspond to the traversing time in seconds, the following equation has to be met: $nLt/\pi d = 10^6 v$, in other words $v = 10^6 \pi d/nLt$.

If in this case for example $d = 20$ mm; $L = 1200$ mm; $t = 4$ and $n = 200$, the result is: $v = 65.45$. As $v$ should be an integral, it is rounded off to 65.

The fastest traversing time is determined by the maximum frequency the step motor 13 can process. The maximum traversing time is practically unlimited and depends on the number of decades of the adjusting element 12.

As a result of the constancy of the crystal oscillator having a deviation of only $\pm 10^{-6}$, also for longer periods it is certain that a given adjustment always results in the same traversing time. The reproduceability of the adjustment as a result of the digital implementation is also very good.

An additional advantage is that the traversing time can be read directly in full seconds on the indication element 13, in practice for example from 30 seconds (minimum) through 9999 seconds (maximum).

I claim:

1. In a system for passing products to be treated through a machine, comprising a driving motor of the stepping type, a plurality of rollers driven by said motor, and a regulating circuit for controlling the driving motor, the improvement wherein the regulating circuit comprises a constant frequency oscillator, a fixed divider into which the output of said oscillator is fed, a variable frequency divider subject to the output of said fixed divider for providing a rectangular output for energizing the driving motor, and means for adjusting said variable frequency divider.

2. In a system according to claim 1, wherein there is additionally provided digital indicating means responsive to adjustment of said adjusting means by which to read the traversing time of the products to be treated.

3. A system according to claim 1, characterized in that the constant frequency oscillator of the regulating circuit comprises a crystal oscillator.

4. A system according to claim 1 characterized in that the regulating circuit further comprises an indication element responsive to adjustment of the adjusting means, by which the traversing time of the products to be treated can be read.

* * * * *